June 27, 1967
T. MILLER
3,327,665
METHOD OF FORMING SEALANT CONTAINING CLOSURE ASSEMBLIES
AND ARTICLE PRODUCED THEREBY
Filed April 1, 1964
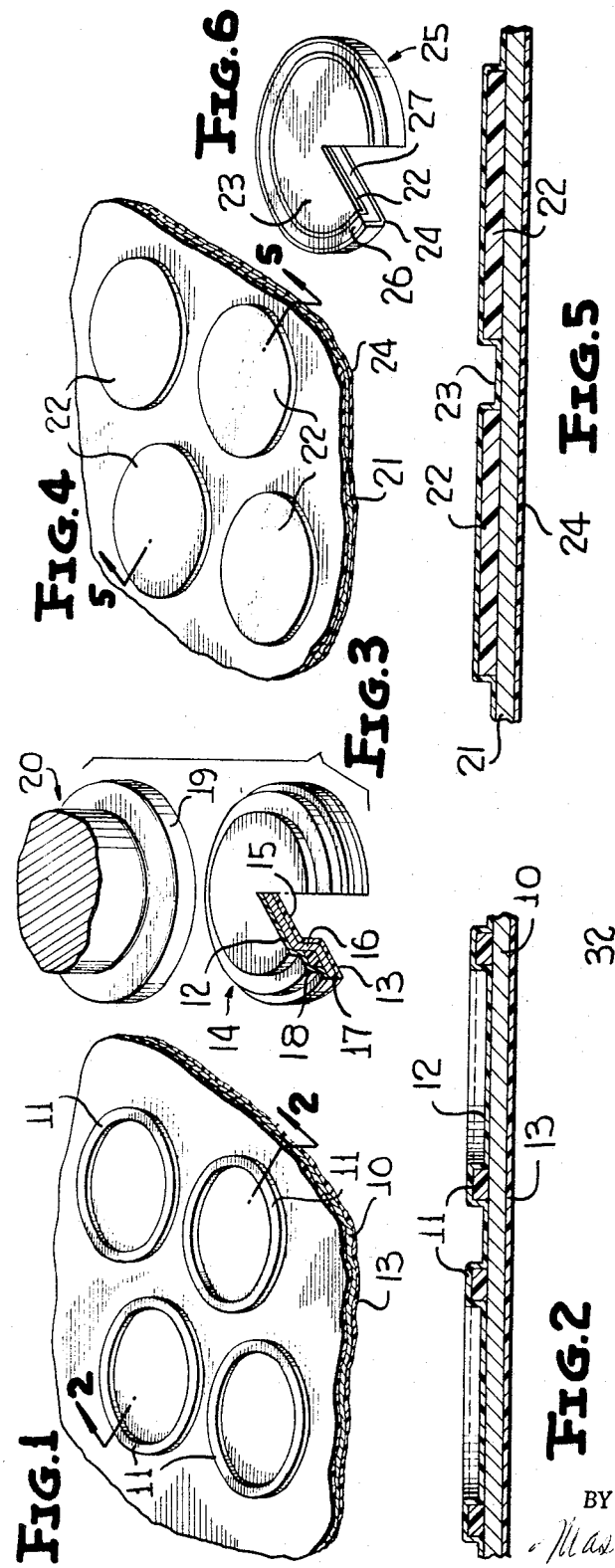
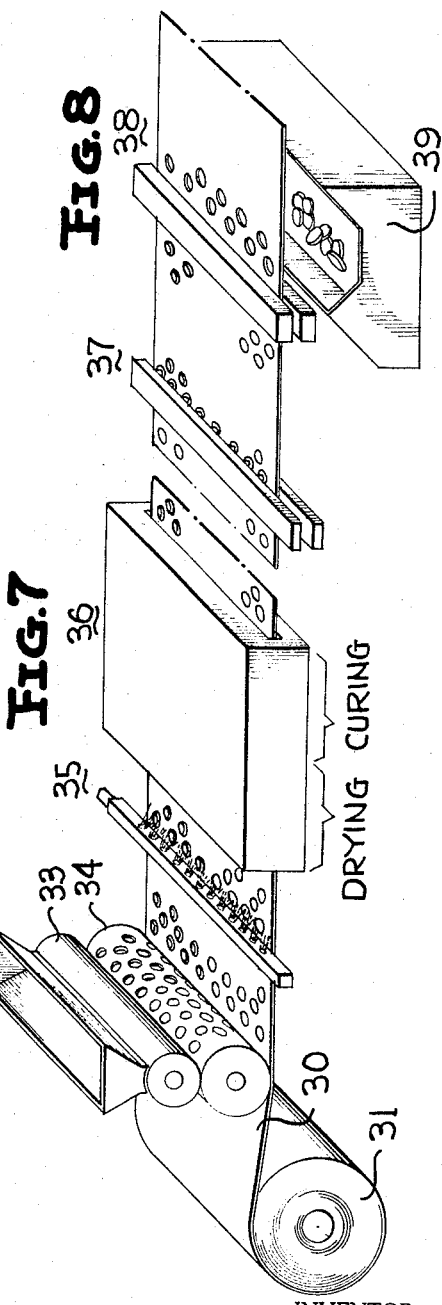
INVENTOR
TEDDY MILLER
BY
ATTORNEYS

United States Patent Office
3,327,665
Patented June 27, 1967

3,327,665
METHOD OF FORMING SEALANT CONTAINING CLOSURE ASSEMBLIES AND ARTICLE PRODUCED THEREBY
Teddy Miller, Chicago, Ill., assignor to Continental Can Company, Inc., New York, N.Y., a corporation of New York
Filed Apr. 1, 1964, Ser. No. 356,398
9 Claims. (Cl. 113—121)

This invention relates to composite sealing and protective coatings, and their production.

It is a known practice to employ a sealing compound, usually of elastic nature, to provide a seal between a cover, lid or end closure and a container body. For example, can ends and jar closures are formed with flanges or skirts, respectively, and a sealing composition is used to form an interposed body at the region of contact between such closures and the container bodies; and various elastomers are employed as liners in closure caps. It is likewise a practice to provide protective coatings of lacquer or enamel over metal surfaces of containers exposed to the atmosphere or to various packaged materials.

For economy, it is a practice to employ as small a quantity of sealing composition as will perform the intended function. One practice is to cover the metal surface with a lacquer which is then baked, and thereafter to provide a pattern of deposits of sealing composition thereon with a further baking wherewith two separate baking operations are performed. When the sealing composition or sealant is later exposed to the atmosphere or the container contents, as well as upon coming into contact with other closing or end assemblies when stacked, there is a consequent sticking together or "blocking" so the assemblies do not readily separate. To avoid this exposure, it has also been proposed to first apply and bake the sealant to cure the deposit and then provide an all-over lacquer coat to the metal where exposed and also over the sealant deposits, with a second baking to cure the lacquer.

It is, therefore, an object of the present invntion to provide an improved method for the application of sealant materials and enamel overcoats to blackplate or tinplate to provide a non-blocking sheet from which container ends may be stamped in an economical and efficient manner.

Another object of the present invention is to provide a method for placing composite sealant deposits and enamel overcoats onto metal sheets without the necessity of individual drying and/or curing steps for the sealant material and for the enamel. This object is accomplished by providing a composite sealant-enamel coating composition system which is both dryable and curable by a single heating operation.

Yet another object of the present invention is to provide an enamel overcoat for sealant deposits which have been placed upon a metal sheet to prevent stacked metal sheets from "blocking" or adhering to one another. The enamel overcoat used to attain this object is dried and cured simultaneously with the drying of the sealant material.

Another object of this invention is to provide a metal sheet having sealant deposits thereon and an uncured lacquer coat there over which may be baked by a single heating to a non-blocking composite sheet.

A further object of the present invention is to provide a more economical and efficient method for the production of container end assemblies which have thereon sealant material and an enamel overcoat.

It has been found that satisfactory end sealant assemblies and like structures can be made with a single drying and baking operation. According to the instant invention, sealant deposits are placed on a sheet by local application, an all-over coating of lacquer or enamel is applied and then the sealant and lacquer are simultaneously dried and cured, respectively, by heating.

An example of practice of this invention is shown on the accompanying drawing, in which:

FIGURE 1 is a perspective view of a portion of a sheet with annular shaped sealant deposits thereon;

FIGURE 2 is a section through the sheet shown in FIGURE 1, illustrating parts of several sealant deposits, with the lacquer coating thereover;

FIGURE 3 is a perspective view of a can end associated with a can body according to this invention with parts of the can end cut away to show details;

FIGURE 4 is a perspective view of a portion of a sheet with circular shaped sealant deposits thereon;

FIGURE 5 is a section through the sheet shown in FIGURE 4;

FIGURE 6 is a perspective view of a container end, according to this invention, with a part cut away;

FIGURE 7 is a schematic perspective view illustrating the method of making the sheets of FIGURES 1 and 4; and FIGURE 8 is a schematic perspective view illustrating the method of forming and cutting container end assemblies from the sheets made by the method of FIGURE 7.

In FIGURE 1, a metal sheet 10 is shown with a number of annular deposits 11 of a sealant composition. As best shown in FIGURE 2, in cross-sectional view, the annular deposits 11 of the sealant material are covered over by the non-blocking and protective lacquer film 12 and, if desired, the reverse side of the metal sheet 10 may be provided with a lacquer coat 13.

In FIGURE 3, a can end 14 is shown with an end panel 15 having a chuck wall 16 therearound and a projecting flange 17 by which the can end may be sealed to a can body flange by conventional practice. An annular deposit 18 of sealant composition is provided on a portion of projecting flange 17 which is to engage the body flange 19 of can body 20. This sealant composition deposit 18 conforms to the shape of the joint created by the sealing together of projecting flange 17 and body flange 19 and fills the space therebetween to prevent leakage of the contained material from the interior of the container which is manufactured from can body 20. The other metal parts, as well as the sealant deposit 18, may be covered by lacquer coatings, such as 12 and 13.

The can end 14, shown in FIGURE 3, results from forming the end panel 15 in a metal sheet which has been coated with annular sealant deposits, such as 11 in FIGURE 1, and has been thereafter coated over with a protective lacquer coating, such as 12, in FIGURE 2. The end panel 15 and its attached chuck wall and projecting flange are then punched from the matrix of the metal sheet material of a metal sheet 10 of FIGURES 1 and 2.

Satisfactory end sealant assemblies of forms other than the can end shown in FIGURE 3 can be manufactured according to the present invention. Container end closures having a flat end panel and dependent chuck walls of either straight or crown-closure configuration can be manufactured with the non-blocking and more economical sealant assemblies manufactured by the present invention. Thus, FIGURE 4 shows a metal sheet 21 which has thereon a number of circular sealant deposits 22. The deposits as well as the exposed metal may be covered over with a non-blocking and protective lacquer film 23, according to the present invention, as shown in FIGURE 5. The reverse side of the metal sheet may be coated with a similar protective coating 24, if desired. After the sealant deposit and the protective lacquer film are deposited, the metal sheet is then conducted to an oven for the single drying and curing step by which the sealant-lacquer assembly composite is processed. After curing, the container closure assembly 25 having the circular sealant deposit in the interior thereof may be formed, as shown in FIGURE 6. The container closure assembly 25 is shown with a straight chuck wall 26 depending from the end panel 27, shown by the sectional view. The circular sealant deposit 22 may be seen overlying the end panel 27 on the same side as the depending chuck wall 26. The non-blocking and protective lacquer film 23 is shown overlying the sealant deposit 22.

A protective lacquer coating 24 on the side of the metal sheet away from the sealant deposit 22 may also be present. The metal material in the end panel 27 and depending chuck wall 26 has been cut out of the metal sheet 21 in FIGURES 4 and 5.

The chuck wall 26 may be wrinkled to provide a crown closure, such as a crown cap, if desired.

With respect to the end closure assemblies for containers of the present invention, the sealant deposits and the overlying non-blocking and protective lacquer films may be deposited on or into the pre-formed container end closures either before or after stamping into form and thereafter cured by a single curing step to effect the more economical and, hence, more usful production of such container closures.

The preferred method of making end closure assemblies, according to the present invention, is illustrated in FIGURES 7 and 8. A continuous metal strip 30 is unwound from a roll 31 and passed under a roll coater at sealant deposit station 32 wherein the sealant material is deposited by a transfer roll 33 and a printing roll 34 onto the moving metal sheet. The lacquer material to form the protective film is deposited by spraying station 35. After the metal sheet 30 is thus coated with both sealant deposits and a protective lacquer film, it is passed into the heating and curing station 36, conveniently shown as an oven. Station 36 also removes the organic dispersants and/or solvents which are present in the drying and curing layers. The printing roll 34 has been shown with printing areas of both solid circular configuration of FIGURES 4-6 and the annular configuration of FIGURES 1-3. By this manner, both can ends, as shown in FIGURE 3, and depending chuck wall closure assemblies, as shown in FIGURE 6, may be manufactured from a single metal sheet 30.

After the metal sheet has been coated with the sealant deposits and the overlying protective film, and cured in the curing station 36 and then cooled, the metal sheet is passed through a forming station 37 having punches which form the end panels 15 and 27 of FIGURES 3 and 6, respectively. The sheet is then passed to a punching station 38 where the individual closure assemblies are cut from the metal sheet and deposited into a receptacle 39.

Two primary advantages which are presented by the method illustrated in the steps of FIGURES 7 and 8 are: (1) that the metal sheet 30, after passing through station 36, may be cut into sections and there stacked one on another without "blocking" or sticking and (2) that only a single heating station 36 is necessary. Thus, a curing station between stations 32 and 35 is unnecessary by reason of the present invention and, hence, the manufacturing process described is more economical and more efficient than previous practices wherein two separate heating steps have been required due to the nature of the sealant deposits and the overlying protecting lacquer.

The sealant compositions which are deposited at station 32 consist, generally, of a synthetic elastomer or rubber which is non-curing and, therefore, remains an elastomer after the heating at station 36. A volatile inert organic dispersant may be employed in compounding the sealant to provide smoother coating at station 32. This dispersant is volatilized by the heating step and is driven off through the lacquer overcoat deposited at station 35. Such dispersant or organic liquid must have a vaporization temperature such that it is liberated from the elastomer by temperatures well below 400° F.

The lacquer or enamel compositions coated onto the metal sheet and on top of the sealant deposits are mixtures of a curable oleo resin composition in a volatile inert organic solvent. The resin compositions employed are curable at temperatures in excess of 400° F. and remain plastic at elevated temperatures under their curing points. This plasticity permits the escape of the vapors of the dispersant from the underlying sealant layer and, therefore, such vapors are removed prior to curing of the enamel overcoat. This permeability to the heated vapors from the drying sealant deposits prevents the formation of blisters or bubbles in the enamel layer which would be caused if such were volatilized after the curing of this layer.

In the following examples, parts are by weight and viscosity values are at 84° F., unless otherwise specified.

*Example I*

Sealant deposits: neoprene rubber _____cps__ 20,000
Lacquer Overcoat:
    Maleic ester rosin adduct _____parts__ 100
    Chinawood oil _____do____ 80
    Mineral spirits _____do____ 270

The neoprene rubber has a viscosity which allows its deposit by the roller coating method described, above, for station 32.

The viscosity of the plastisol lacquer overcoat is in the range of 140–180 centipoises and the solids content is 40%. The suspended oleo resinous components have a curing temperature of 405–415° F. and a curing time of 9–11 minutes. At elevated temperatures attained during the heating-up of the metal sheet, the mineral spirits solvent is dried off and the enamel resinous components remain plastic and permeable to organic vapors. When such solvents are used to compound the sealant deposits material, they are volatilized off through this plastic layer prior to its curing at temperatures in excess of 400° F. as desired.

The main requirements of the laquer composition are that the resinous components have a curing temperature in excess of 400° F. and remain plastic and organic vapor permeable at elevated temperatures therebelow. A composition which also meets these criteria is set out in the following formulation.

*Example II*

| Enamel composition: | Parts |
|---|---|
| Polycyclopentadiene | 78 |
| Chinawood oil | 125 |
| Mineral spirits | 238 |

The viscosity of this enamel formulation is approximately 135 centipoises and the solids content is 46%. This lacquer cures at 405–415° F. when a time period of 9–11 minutes is employed.

The solids content of the plastisol lacquer composition may be over a range of 40–50%.

If desired, dispersants may be used with the synthetic rubbers of the sealant compositions to lower the viscosity thereof to approximately 20,000 centipoises. A composition which is usable as a sealant is a 70% solids mixture of SBR-type rubber and a base oil. Such dispersants are volatalized and driven out of the synthetic rubber deposits prior to the curing of the overlying enamel coats at temperatures greater than 400° F.

It is obvious that the illustrative practices are not restrictive; and that the invention can be practiced in many ways within the scope of the appended claimed subject matter.

I claim:
1. The method of forming a non-blocking sealant-lacquer laminate on a metal sheet which comprises the steps of:

(a) placing a deposit of a sealant composition suspended in an inert volatile organic dispersant on a metal sheet;

(b) immediately thereafter coating the areas of the deposit and the exposed metal surfaces with a plastisol of a curable lacquer resin suspended in an inert volatile organic liquid;

(c) the curable resin having a baking temperature of at least 400° F. and remaining organic vapor permeable below said baking temperature;

(d) passing the coated metal sheet through a heating station to drive off the volatile organic dispersant of the sealing deposit and the volatile organic liquid of the lacquer resin; and (e) curing the curable lacquer resin by further application of heat.

2. The method of claim 1 in which said curing is at 405–415° F. for 9–11 minutes.

3. The method of forming container closure assemblies consisting of a metal base portion, a sealant deposit over a part of metal base and an overlying protective coat of a cured lacquer resin which comprises the steps of:

(a) placing a multiplicity of discrete deposits of a sealant composition suspended in a volatile inert organic dispersant upon a metal sheet;

(b) immediately thereafter coating the deposits and the exposed metal surface with a plastisol of a curable laquer resin suspended in a volatile inert organic liquid;

(c) the curable resin having a baking temperature of at least 400° F. and remaining organic vapor permeable below said baking temperature;

(d) passing the coated metal sheet through a heating station to drive off the volatile organic dispersant of the sealant deposits and the organic liquid of the plastisol coat;

(e) curing the lacquer resin by further application of heat;

(f) passing the metal sheet containing the sealant deposits and cured lacquer coat through a forming station of form closure assemblies by drawing of the metal of the coated sheets; and (g) thereafter, passing the coated and formed metal sheet through a punching station for punching non-blocking container closure assemblies from the metal matrix of the metal sheet.

4. The method of forming non-blocking container closure assemblies of claim 3 in which the forming of the container closure assemblies from the planar metal sheet presents raised portions having circular areas with which the deposits of sealant composition are axially aligned.

5. The method of forming non-blocking container closure assemblies as in claim 3 in which the plastisol consists of a 40–50 weight percent mixture of oleo resinous Chinawood oil-maleic ester rosin adduct in mineral spirits.

6. The method of forming non-blocking container closure assemblies as in claim 3 in which the plastisol consists of a 40–50 weight percent mixture of oleo resinous Chinawood oil-poly(cyclo-pentadiene) in mineral spirits.

7. An oleo resinous composition competent to form a plastisol with mineral spirits having a curing temperature in excess of 400° F. and remaining organic vapor permeable at elevated temperatures below 400° F.

8. An oleo resinous composition competent to form a plastisol with mineral spirits having a curing temperature in excess of 400° F. and remaining organic vapor permeable at elevated temperatures below 400° F. comprising Chinawood oil and maleic ester rosin adduct in proportions of approximately 80:100.

9. A sealant and wet-lacquer laminate coated to a metal substrate competent to dry and cure by a single heating to form a non-blocking laminate from which container closure assemblies may be stamped comprising a plurality of discrete sealant deposits of a conventional elastomer mixed with a volatile inert organic dispersant coated to said metal substrate, and a wet-lacquer coat covering at least all of said sealant deposits, said wet-lacquer coat containing a curable oleo-resin mixed with a volatile inert organic liquid, said curable oleo-resin curable by application of temperatures in excess of 400° F. and remaining permeable to said organic dispersant at temperatures below 400° F., and said organic dispersant vaporizable from said elastomer at temperatures substantially below 400° F.

References Cited

UNITED STATES PATENTS

| | | | |
|---|---|---|---|
| 2,054,389 | 9/1936 | Rosenthal et al. | 117—75 |
| 2,663,909 | 12/1953 | Maier et al. | 18—59 |
| 3,005,433 | 10/1961 | Risch | 113—121 |
| 3,029,765 | 4/1962 | Navikas | 113—80 |
| 3,034,926 | 5/1962 | Carter et al. | 117—75 |
| 3,131,081 | 4/1964 | Husum | 117—45 |
| 3,216,848 | 11/1965 | Hart et al. | 117—75 |

CHARLES W. LANHAM, *Primary Examiner.*

R. D. GREFE, *Assistant Examiner.*